3,558,357
SOLID-ELECTROLYTE CELL WITH TELLURIUM OR SELENIUM ELECTRODE AND Ag₃SI OR RbAg₄I₅ ELECTROLYTE
Takehiko Takahashi, 4–81 Ueda Umemorizaka, Tenpaku-cho, Showa-ku, Nagoya-shi, Japan, and Osamu Yamamoto, 55 1-chome, Naruko-cho, Midori-ku, Nagoya-shi, Aichi-ken, Japan
No Drawing. Filed Jan. 17, 1969, Ser. No. 792,150
Claims priority, application Japan, Mar. 30, 1968, 43/20,819
Int. Cl. H01m 35/02
U.S. Cl. 136—6                    12 Claims

ABSTRACT OF THE DISCLOSURE

A laminated assembly of a thin solid electrolyte of $RbAg_4I_5$, or $Ag_3SI$ sandwiched between a thin anode of silver or a material containing silver and a thin cathode of tellurium, selenium, or a material containing tellurium or selenium. The electrolyte and cathode can be easily formed by vacuum evaporation deposition. A layer-built solid-electrolyte cell can be readily fabricated by successive repetitions of the vacuum evaporation procedure to build up a plurality of unit cells in stacked formation.

BACKGROUND OF THE INVENTION

This invention relates to electrochemical cells and more particularly to electrochemical cells composed entirely of solid components and to layer-built cell batteries thereof. More specifically, the invention concerns a new solid-electrolyte cell in which use is made of a cathode material which can be readily rendered into a thin film and, moreover, can be used at temperatures over a wide range.

Solid-electrolyte cells have the advantageous features of compactness, long shelf life, and wide range of temperatures at which they can be operated.

The materials heretofore used as cathode materials in known solid-electrolyte cells have been halogens such as iodine and polyhalogenides such as $CsI_4$. With these materials, however, it is difficult to produce cells operable at temperatures over a wide range. For example, iodine has a relatively low vapor pressure of 0.2 mm. Hg at 20 degrees C., but this becomes 60 mm. Hg at 100 degrees C., whereby it is difficult to make the entire cell gastight. A polyhalogenide such as $CsI_4$ has a low vapor pressure at room temperature or lower temperature, whereby discharging with a high current density is not possible. Furthermore, since these materials react very readily with metals, they necessitate a thoroughly gastight cell structure.

A solid-electrolyte cell comprises an anode, a cathode, and a solid electrolyte in which only ions are mobile. The solid electrolytes heretofore used in solid-electrolyte cells have principally been silver halides as, for example, silver iodide and silver bromide. These silver halides have very low ionic conductivities at room temperature, and when they are used as electrolytes of storage cells, they give rise to an increase in the internal resistance of the cell and to difficulty in discharging with a high current density. This high internal resistance has hitherto been the greatest obstacle to the reduction of known solid-electrolyte cells to practical use.

Recently, researchers deserving much attention on solid electrolytes have been carried out and have afforded the provision of solid-electrolyte cells of higher performance. One of these is that of Takehiko Takahashi and others who provided a $Ag_3SI$, $AgI-Ag_2S-HgI_2$ solid solution, a $AgI-Ag_2Te-HgI_2$ solid solution, and a $AgI-Ag_2Se-HgI_2$ solid solution. (Takahashi, T., et al., Denki-Kagaku, 32, 1610 (1964), ibid 35, 264 (1967), ibid 35, 651 (1967), ibid 35, 682 (1967)). Another research is that by J. N. Bradley and others who provided $RbAg_4I_5$, $KAg_4I_5$. (Bradley, J. N., et al., Trans. Faraday Soc., 63, 424 (1967), ibid 62, 2069 (1966)). The electrical (volume) conductivities of these compounds and solid solutions, as set forth in Table 1, are much higher than those of silver iodide and like halides.

TABLE 1

| Compound or solid solution | Temperature, °C. | Electrical conductivity, $\Omega^{-1}$ cm.$^{-1}$ | Melting point or decomposition temp., °C. |
|---|---|---|---|
| $Ag_3SI$ | 25 | $1 \times 10^{-2}$ | 700 |
| $Ag_2Hg_{0.25}S_{0.5}I_{1.5}$ | 25 | $7 \times 10^{-2}$ | 150 |
| $Ag_4HgSe_2I_3$ | 25 | $1.5 \times 10^{-2}$ | 150 |
| $(AgI)_{0.3}(HgI_2)_{0.25} \sim 0.4 \sim 0.30$ | 25 | $2.8 \times 10^{-2}$ | 150 |
| $(Ag_2Te)_{0.35} \sim 0.40$: | | | |
| $RbAg_4I_5$ | 25 | $2 \times 10^{-1}$ | 220 |
| $KAg_4I_5$ | 40 | $7 \times 10^{-2}$ | 240 |

SUMMARY OF THE INVENTION

It is an object of the present invention to provide a solid-electrolyte cell in which the vapor pressure is low at temperatures in a wide range, and high voltage is maintained even during discharge with a high current density.

More specifically, an object of the invention is to provide, by utilizing the findings we have made as described hereinafter, a solid-electrolyte in which use is made of a cathode material having a very low vapor pressure, and high voltage can be sustained with high current density.

Another object of the invention is to provide a cell which is dischargeable at temperatures in a wide range.

Still another object of the invention is to provide a cell in which all components thereof are in the form of thin films which can be easily formed by vacuum evaporation deposition, whereby the entire cell can be made thin and compact.

A further object of the invention is to provide a layer-built cell comprising a plurality of cell units of the above stated character stacked in laminated arrangement and fabricated by mere repetition of the simple procedure for fabricating single unit cells.

According to the present invention, briefly sumarized, there is provided a solid-electrolyte cell containing at least selenium or tellurium as a cathode material.

According to the present invention there is further provided a layer-built cell comprising a plurality of unit cells each of the above stated character in stacked laminated arrangement.

According to the present invention there is further provided processes for fabricating solid-electrolyte cells and layer-built cells each comprising a plurality of unit solid-electrolyte cells.

The nature, details, and utility of the invention will be more clearly apparent from the following detailed description beginning with general considerations and concluding with specific examples of preferred embodiment of the invention.

DETAILED DESCRIPTION

Of the compounds and solid solutions set forth in Table 1, $Ag_3SI$ is capable of forming a thin film of a thickness of the order of from 10 to 30 microns on a silver plate. (Yamamoto, O., et al., Denki-Kagaku, 34,833 (1966)). Furthermore, $RbAg_4I_5$ is capable of forming a thin film of a thickness of the order of from 10 to 100 microns by vacuum evaporation deposition.

Accordingly, by using a solid of high ionic conductivity as set forth in Table 1 as an electrolyte and combining it with a cathode material according to the invention, it is possible to provide an excellent solid-electrolyte cell. Since silver ions are charge carriers of the compounds and solid solutions set forth in Table 1, silver is used for the anode.

The requirements for a cathode material of a solid-electrolyte cell are as follows.

(1) A large electromotive force.
(2) Facility of formation of a thin film.
(3) Low polarization of the cathode.
(4) Functioning of the discharge product as a silver ion conductor.

The above requirements (1) and (2) are necessary for attaining compactness and high voltage, while requirements (3) and (4) are necessary for discharge with a high current density.

As a result of our search for substances which satisfy the above stated requirements, we have found that tellurium and selenium are excellent as described below. Tellurium is a solid having, at room temperature, a very low vapor pressure and a high electrical conductivity (2.6 ohm$^{-1}$ cm.$^{-1}$ at 20° C.) and having a melting point of 450 degrees C. Furthermore, tellurium is capable of readily forming a thin film by vacuum evaporation.

The results of our measurement of the open circuit voltage of a Ag|$x$|Te (where $x$ denotes a silver ion conductor, e.g., Ag$_3$SI) cell at different temperatures are shown in Table 2. The cell reaction of this cell may be considered to be the formation of Ag$_2$Te in accordance with the following chemical Equation 1. In an actual instance of practice, the formation of Ag$_2$Te was verified by the results of X-ray diffraction analysis of the reaction product at the cathode.

$$2Ag + Te = Ag_2Te \qquad (1)$$

As far as we are aware, there are no past reports on the free enthalpy of the reaction of Equation 1. In a Ag-Te cell in which tellurium is used as the cathode material, Ag$_2$Te is formed as a result of discharge as indicated by Equation 1, but since Ag$_2$Te has a relatively high ionic conductivity (approximately $5 \times 10^{-4}$ ohm$^{-1}$ cm.$^{-1}$ at 20° C.) and a very high electronic conductivity (approximately $5 \times 10^2$ ohm$^{-1}$ cm.$^{-1}$ at 20° C.), even if a Ag$_2$Te layer is formed in the interface between the electrolyte and the cathode, a further discharge reaction can occur while this Ag$_2$Te layer is still relatively thin.

Selenium is a solid having a melting point of 217 degrees C. and a low vapor pressure at room temperature. While the electrical conductivity of selenium is substantially less than that of tellurium, being approximately $10^{-5}$ ohm$^{-1}$ cm.$^{-1}$ at room temperature, selenium can be readily caused to form a thin film by vacuum evaporation.

The results of our measurement of the open circuit voltage of a Ag|$x$|Se cell are indicated in Table 2. These values may be considered to be electromotive force values of the Ag$_2$Se formation cell. In the case of selenium, similarly as in the case of tellurium, Ag$_2$Se is formed as a discharge reaction product at the interface between the cathode and the electrolyte. Since Ag$_2$Se also has a relatively high ionic conductivity ($10^{-4}$ to $10^{-3}$ ohm$^{-1}$ cm.$^{-1}$ at 20° C.) and a very high electronic conductivity, there is no possibility of the electrode reaction being precipitously obstructed or impaired by the formation of this Ag$_2$Se.

TABLE 2

| Temperature (° C.) | Ag|$x$|Te cell e.m.f. (volt) | Ag|$x$|Se cell e.m.f. (volt) |
|---|---|---|
| 20 | 0.217 | 0.265 |
| 60 | 0.219 | 0.268 |
| 100 | 0.223 | 0.271 |
| 200 | 0.245 | |
| 300 | 0.270 | |

Examples of materials suitable for use as the anode of the cell in accordance with invention are silver, mixtures of silver and RbAg$_4$I$_5$, mixtures of silver and AgI, and mixtures of silver and Ag$_3$SI. Examples of materials suitable for use as the solid electrolyte are RbAg$_4$I$_5$, and Ag$_3$SI. Examples of suitable cathode materials are: selenium, tellurium; mixtures of tellurium, RbAg$_4$I$_5$, and AgTe; mixtures of selenium, RbAg$_4$I$_5$, and AgSe; mixtures of selenium or tellurium and AgI; and mixtures of selenium or tellurium and Ag$_3$SI.

In order to indicate still more fully the nature and utility of the invention, the following specific examples of preferred embodiment of the invention are set forth, it being understood that these examples are presented as illustrative only and that they are not intended to limit the scope of the invention.

EXAMPLE 1

9.3 grams (g.) of silver iodide and 2.1 g. of rubidium iodide were mixed and ground. The resulting mixture was sealed under a vacuum within a glass tube, caused to react for 2 hours at a temperature of 500 degrees C., then cooled abruptly, and again caused to react for 15 hours at 160 degrees C. thereby to synthesize RbAg$_4$I$_5$.

A mixture of 0.5 g. of this RbAg$_4$I$_5$ and 0.3 g. of silver powder of 200-mesh particle size to form an anode, 0.5 g. of the RbAg$_4$I$_5$ to form an electrolyte, and a mixture of 0.5 g. of the RbAg$_4$I$_5$, 0.2 g. of tellurium, and 0.1 g. of silver telluride to form a cathode were stacked in laminar arrangement and pressed into a tablet of a diameter of 1.2 cm. A silver wire and a gold wire were connected as lead wires to the anode and cathode side, respectively, of the tablet, and the entire tablet was bonded with an epoxy resin thereby to form a cell.

At room temperature, this cell exhibited an open circuit voltage of 0.21 volt and a voltage of 0.14 volt when discharging with an internal resistance of 1 ohm and 40 ma. When the cell was discharged with a current of 10 ma, the capacity up to the instant at which the cell voltage became 0.1 volt was 40 ma. hour. At 100 degrees C., the cell exhibited an open circuit voltage of 0.23 volt and a voltage of 0.17 volt when discharging with an internal resistance of 1 ohm and 40 ma.

This cell was rechargeable. When it was charged with a current of 10 ma., and a charge voltage of 0.33 volt for 4 hours and then discharged, it exhibited the same discharge curve as that of the first discharge.

EXAMPLE 2

A cell was fabricated in accordance with procedure set forth in Example 1 except for the use of selenium instead of tellurium and silver selenide instead of silver telluride. At a temperature of 25 degrees C., this cell exhibited an open circuit voltage of 0.25 volt and an internal resistance of 3 ohms. When discharging with a current of 10 ma., the cell exhibited a voltage of 0.14 volt. The capacity of the cell when discharged with 5 ma. up to the instant at which the cell voltage became 0.1 volt was 30 ma. hour.

EXAMPLE 3

A mixture of 0.7 g. of silver iodide and 1.0 g. of 200-mesh silver powder was molded into a tablet of a diameter of 1.2 cm. to be used as an anode. 1.5 g. of silver iodide was molded into a 1.2-cm. diameter tablet to be used as an electrolyte. A mixture of 0.7 g. of silver iodide and 0.5 g. of tellurium was molded into a tablet of the same diameter to be used as a cathode. These three tablets were then stacked laminarly in the order of anode-electrolyte-cathode and held in pressed state in a stainless-steel holder.

At a temperature below 147 degrees C., the modification temperature of silver iodide, this cell exhibited a high internal resistance and could not discharge with a high current density. At a higher temperature, however, the internal resistance became less than 1 ohm, and discharge with a high current was possible. At 250 degrees C., the open circuit voltage was 0.26 volt. When, with a current of 50 ma. and an initial voltage of 0.15 volt, the cell was discharged continuously for 3 hours, the cell voltage become 0.12 volt.

Recharging with a current of 50 ma. was also possible, during which the charge voltage became 0.33 volt. When, after recharging thus for 3 hours, the cell was discharged, the same discharge curve as that of the initial discharge was obtained.

EXAMPLE 4

4.7 g. of silver iodide and 4.9 g. of silver sulfide were thoroughly mixed and ground. The resulting mixture was sealed within a glass tube under a vacuum and heated to cause reaction thereof for 17 hours at 550 degrees C., whereby $Ag_3SI$ was produced.

A mixture of 0.5 g. of this $Ag_3SI$ and 0.2 g. of silver powder of 200-mesh particle size was press-molded into a tablet of 1.2 cm. diameter to constitute an anode. 1.0 g. of the $Ag_3SI$ was press-molded into a tablet of 1-2 cm. diameter to constitute an electrolyte. A mixture of 0.5 g. of tellurium and 0.7 g. of the $Ag_3SI$ was press-molded into a similar tablet to constitute a cathode. The three tablets were stacked laminarly in the order of anode-electrolyte-cathode and held in pressed state in a stainless-steel holder thereby to form a cell.

At 20 degrees C., this cell had an internal resistance of 10 ohms, and when discharging with a current of 1 ma., a voltage of 0.13 volt was obtained. At 200 degrees C., the internal resistance of the cell was 3 ohms, the open circuit voltage was 0.25 volt, and when discharging with 10 ma., a voltage of 0.13 volt was obtained.

EXAMPLE 5

On one surface of a silver disk of a diameter of 1.0 cm. and a thickness of 0.003 cm., $RbAg_4I_5$ was deposited by a vacuum evaporation to form a layer thereof of a thickness of approximately 0.003 cm. On this layer, tellurium was deposited by vacuum evaporation to form a layer thereof of a thickness of approximately 0.001 cm. On this layer of tellurium, a gold layer of a thickness of approximately 0.0001 cm. was deposited by vacuum evaporation. In this manner, a unit cell was formed.

In the same manner, six unit cells were fabricated in stacked arrangement entirely by vacuum evaporation. The entire structure thus fabricated was bonded with epoxy resin similarly as in Example 1.

At 25 degrees C., the open circuit voltage of this combined cell was 1.2 volts, and when discharging with a current of 5 ma., a voltage of 0.9 volt was obtained. The capacity with a 2 ma. discharge was 5 ma. hour.

EXAMPLE 6

A silver plate of 0.003 cm. thickness was heat treated for 10 minutes at 200 degrees C. in a stream of a gaseous mixture of hydrogen sulfide and air (volumetric ratio of 1:3) thereby to form a silver sulfide layer on the silver plate. The resulting plate was treated for 15 hours in iodine at room temperature (25 degrees C.) and then caused to undergo reaction for 10 hours in a stream of nitrogen gas at 300 degrees C., whereupon a layer of $Ag_3SI$ of a thickness of approximately 0.002 cm. was formed on the plate.

From the resulting plate, a disk of 1.0 cm. diameter was cut out. On the electrolyte side of this disk, a tellurium layer of approximately 0.03 cm. thickness was deposited by vacuum evaporation, and on this layer, a gold layer of approximately 0.0001 cm. thickness was deposited by vacuum evaporation. A unit cell was thus fabricated.

By repeating this procedure, six of these unit cells were fabricated in stacked arrangement to form a layer-built cell. At 25 degrees C., this layer-built cell exhibited an open circuit voltage of 1.2 volts, and when the cell was discharging with 2 ma, a voltage of 0.9 volt was obtained. The capacity when the cell was discharged with a current of 1 ma. was 10 ma. hour.

As described above, while the solid-electrolyte cell according to the invention exhibits a lower open circuit voltage than that of a cell in which a halogen is used as the cathode material, the cell of the invention is capable of discharging with a current density of several ma./cm.² even at room temperature. Moreover, tellurium and selenium do not melt at temperatures up to 350 degrees C. and 217 degrees C., respectively, and because of the low vapor pressures, fully gastight cells can be readily fabricated.

Another feature of the invention is that, when tellurium is used, thin films can be formed in a simple manner by vacuum evaporation, whereby the entire cell can be made extremely thin. Since the electrical conductivity of selenium is substantially lower than that of tellurium, the discharging characteristic of the cell when one or more selenium thin films are used is poorer than that when tellurium thin films are used.

It may be mentioned for reference that when sulfur or oxygen of the same group as tellurium and selenium is used as a cathode material, since the silver ion electric conductivity of the reaction formation product, $Ag_2S$ or $Ag_2O$, is very low at room temperature, the discharge characteristic is greatly inferior at room temperature to that of tellurium or selenium, and, moreover, it is difficult to form a thin film cathode.

We claim:
1. A solid-electrolyte cell comprising a silver anode, a tellurium cathode, and a $Ag_3SI$ electrolyte.
2. A solid-electrolyte cell comprising a silver anode, a selenium cathode, and a $Ag_3SI$ electrolyte.
3. A solid-electrolyte cell comprising a silver anode, a tellurium cathode, and a $RbAg_4I_5$ electrolyte.
4. A solid-electrolyte cell comprising a silver anode, a selenium cathode, and a $RbAg_4I_5$ electrolyte.
5. A solid-electrolyte cell comprising a silver anode, a thin film solid electrolyte of $RbAg_4I_5$ vacuum evaporation deposited on said silver anode and a thin film cathode of tellurium vacuum evaporation deposited over said solid electrolyte film.
6. A solid-electrolyte cell comprising a silver anode, a thin film solid electrolyte of $RbAg_4I_5$ vacuum evaporation deposited on said silver anode and a thin film cathode of selenium vacuum evaporation deposited over said solid electrolyte film.
7. A solid-electrolyte cell comprising a silver anode, a thin film solid electrolyte of $AG_3SI$ vacuum evaporation deposited on said silver anode and a thin film cathode of tellurium vacuum evaporation deposited over said solid electrolyte film.
8. A solid-electrolyte cell comprising a silver anode, a thin film solid electrolyte of $Ag_3SI$ vacuum evaporation deposited on said silver anode and a thin film cathode of selenium vacuum evaporation deposited over said solid electrolyte film.
9. A process of making a solid-electrolyte cell comprising forming a silver anode depositing on said anode by vacuum evaporation deposition a thin film of a solid electrolyte selected from the group consisting of $RbAg_4I_5$ and $Ag_3SI$ and depositing over said electrolyte by vacuum evaporation deposition a thin film of cathode material selected from the group consisting of tellurium and selenium.
10. A process according to claim 9, further comprising depositing over said cathode film by vacuum evaporation deposition a layer of gold.
11. A process according to claim 10 comprising repeating the vacuum evaporation deposition steps to form a plurality of unit cells in stacked formation.
12. A process of making a solid-electrolyte cell comprising forming a silver anode, forming in situ on said anode a first layer of a compound selected from the group consisting of $RbAg_4I_5$ and $Ag_3SI$ and depositing over said first layer by vacuum evaporation deposition a second layer of a material selected from the group consisting of tellurium and selenium.

References Cited

UNITED STATES PATENTS

| | | | |
|---|---|---|---|
| 2,689,876 | 9/1954 | Lehovec | 136—153 |
| 2,718,539 | 9/1955 | Bradshaw et al. | 136—153 |
| 3,038,953 | 6/1962 | Lieb et al. | 136—153 |
| 3,375,135 | 3/1968 | Moulton et al. | 136—6 |
| 3,443,997 | 5/1969 | Argue et al. | 136—153 |

OTHER REFERENCES

Journal of Electrochemical Society, Kiukkola et al., vol. 104, No. 6, June 1957, pp. 379–385.

ALLEN B. CURTIS, Primary Examiner

C. F. LeFEVOUR, Assistant Examiner

U.S. Cl. X.R.

136—83, 153